United States Patent Office 3,230,094
Patented Jan. 18, 1966

3,230,094
POTATO CHIP PRODUCTS AND PROCESS FOR MAKING SAME
Barney W. Hilton, Richardson, Tex., assignor, by mesne assignments, to Frito-Lay, Inc., Dallas, Tex., a corporation of Delaware
No Drawing. Filed May 24, 1963, Ser. No. 282,877
7 Claims. (Cl. 99—207)

This application is a continuation-in-part of my pending application Serial No. 201,751, filed June 12, 1962, now Patent Number 3,109,739.

This invention relates to a potato product, and particularly to a deep fat fried potato product, which is of a completely homogeneous nature. This invention also relates to a process for making such products.

There are a great many disadvantages inherent in the methods presently employed in the processing of potatoes in the formation of commercial products such as potato chips. Many of these problems relate to the raw potato from which the product is made.

At the present time, potatoes are commonly cured by storing at temperatures of from 50–75° F. for periods up to three months for the purpose of sugar removal. This requires extensive storage facilities in which the temperature and humidity must be carefully controlled. Potatoes so stored tend to sprout to a considerable extent. This sprouting results in great economic loss due to shrinkage and the necessity for removing the sprouts prior to processing.

In the production of potato chips according to conventional techniques, after the potatoes have been stored as previously described to lower the sugar level, they are peeled, sliced into chips and washed prior to frying. Considerable loss of solids occurs during the slicing and washing operation due to the extremely large surface area of the chips. Commonly, this loss amounts to about 11% of the total solids.

It is well known that natural potatoes vary greatly in their composition, such as sugar content, solids content, flavor, etc. The extent of these variations are influenced by many factors such as the type of potatoes, the season when harvested, the area where grown, their culture during the growing season, the length of time they are stored prior to use, etc. These variations result in non-uniformity of products made from the potatoes. For example, it is known that the rate of browning of a potato product during processing such as deep fat frying is influenced by the reducing sugar content of the potato. Therefore, potato chips made from one potato may be much darker in color than those made from another potato due to the difference in reducing sugar content between the different potatoes. This correlation between the reducing sugar content of a potato and the extent of browning of chips made from the potato imposes a serious limitation on the selection of potatoes which may be used in chip manufacture. It has been reported in the literature that in most instances, acceptably colored chips may be made from potatoes of less than 0.2 percent reducing sugars; but that chips made from potatoes containing more than 0.25 percent reducing sugar generally are too dark to be commercially acceptable.

Furthermore, the oil absorption rate of a potato product varies with the solids content of the potato. Generally, it has been found that for every 1% by weight decrease in solids content of the raw potato, the amount by weight of oil which the potato product is capable of absorbing increases by about 1½%. For example, when potato solids vary from 16 to 17% by weight, the amount of oil which the potato product will absorb will vary from approximately 40 to 38½% by weight. This results in potato chips made from different potatoes having markedly different oil contents due to variances in solids content of the potatoes.

Moreover, individual potatoes are not of uniform composition. For example, each potato contains a layer, a fraction of an inch below the surface of the potato, which completely encloses the inner portion of the potato. This layer may be higher in reducing sugar content than any of the rest of the potato and the portion of the potato which is enclosed by this layer may be of a higher reducing sugar content than the portion of the potato lying immediately below the surface. Since the rate of browning on frying varies with the reducing sugar content, each potato chip may therefore have at least three distinct areas of different degrees of browning. Moreover, bruises result in localized areas of high reducing sugar concentrations. Consequently, bruised areas will generally result in unsightly dark spots on the chips when the chips are fried. Also, the inner portion of a natural potato has a lower solids content than does the outer portion. Therefore a chip sliced from a natural raw potato will, when fried, have areas of varying oil content due to the different rates of oil absorption in the areas of varying solids content.

Attempts have been made to produce artificial potato products from potato flour, mashed potatoes or other farinaceous materials high in starch content. However, it has not heretofore been possible to achieve a proper balance of true potato flavor and texture in the resultant product which is necessary in an acceptable commercial product.

It is an object of this invention to provide potato products of a completely homogeneous nature. It is another object of this invention to eliminate the necessity for storing raw potatoes for long periods of time prior to processing. It is a further object of this invention to avoid the high losses of potato solids generally associated with potato chip production.

It is another object of this invention to produce high quality potato chips from potatoes having a high reducing sugar content.

It is still a further object of this invention to produce from fresh, raw potatoes, which may be of widely divergent compositions and characteristics, deep fat fried potato products, such as potato chips, which are of uniform color, texture, flavor, solids content and oil content. It is yet another object of this invention to provide a means for consistently producing potato chips having the same uniform characteristics.

These, and other objects, are accomplished by the practice of this invention which, briefly, comprises reducing the particle size of raw potatoes, which may have been previously peeled, sliced, washed and treated with an inhibiting agent to prevent enzymatic browning, to form a mixture of finely divided solids in liquid. This mixture is then heated to gelatinize at least 80% by weight of the starch and thereby increase its viscosity. Subsequently, the mixture, preferably after being cooled to from about 30 to 150° F., is formed into shaped bodies, such as chips. These shaped bodies are then dried to bring their solids content to from 50 to 95% by weight and are then cooked as by frying in deep fat.

According to the practice of this invention, potatoes of different varieties, size and compositions may be used as starting materials. They are generally first peeled, sliced into smaller pieces, and washed by techniques well known to the art. The size of the pieces into which the potatoes are sliced is not critical but varies generally between ¼ to 1 inch in diameter. The optimum size of these pieces will depend on the type of apparatus which will be used to reduce the particle size to form the mixture of finely divided solids in liquid. If the potato pieces are to be stored for any length of time at any point prior to the completion of the operation, or if subjected to a current of air during the grinding operation, they should be treated with a suitable inhibiting agent, such as by dipping them in a dilute solution of sodium bisulfite or sulfurous acid, to prevent enzymatic browning. Such treatment is wholly conventional and does not constitute a part of this invention.

The potato pieces are then subjected to a treatment which reduces the particle size of the potatoes. This treatment ruptures a portion of the starch cells in the potato and releases the liquid contained in the starch granules or parenchyma cells. The amount of liquid released increases as the particle size decreases. A mixture of finely divided solids and liquid, or a pulp, is thereby formed. This mixture is composed of intact cells, ruptured cells, liberated starch granules and cell sap and has a viscosity of about 7 to $10 \times 10^4$ cps. The maximum particle size of the solids in the mixture should not be greater than that which may be accommodated during subsequent operations. For example, if the material is to be subsequently extruded to form potato chips, no particles should be of a larger diameter than the orifice through which they must be extruded—i.e., if the orifice is 0.035 inch thick, no particle should have a diameter greater than 0.035 inch. The particles may be either uniform or random in size.

Reduction of the particle size of the potatoes may be accomplished in any apparatus which will cut or shear the potatoes into fine particles. Crushing of the potatoes should be avoided since this results in the formation of a "stringy" pulp and adversely affects the flavor and texture of the final products. It is preferred to avoid high temperatures in the formation of the pulp since high temperatures may adversely affect the flavor characteristics of the product. A Fitzpatrick mill may be used to reduce the particle size of the potatoes. Particularly good results have been obtained by the use of an Urschel cutting mill which reduces the particle size to from about 0.01 to 0.02 inch in diameter.

After the particle size of the potatoes has been reduced to form a mixture of finely divided solids and liquid, part of the liquid may be separated from the mixture, processed in a manner hereinafter described and subsequently returned to the solids phase. For example, from about 40 to about 80%, by weight of the mixture of finely divided solids and liquid may be removed in the separation step. The separation of the liquid may be accomplished by means of a centrifuge, a screw press or by means of filtration. The liquid which is separated from the puree contains a major portion of the reducing sugar and amino acids content which was originally present in the potatoes. The extent of removal of these constituents will depend upon the amount of liquid separated from the mixture of finely divided solids and liquid. By controlling the reducing sugar content of the solids phase, the extent of browning of the final product may also be controlled. Before the separated liquid is returned to the solids phase, it may first be treated to remove the reducing sugars and/or amino acids contained therein. Since heat browning does not occur unless both amino acids and reducing sugars are present, browning may be controlled by removal of a portion of either one or the other of these constituents. The reducing sugars content of the liquid may be removed by means of any of the standard methods which are known to remove sugar from liquids such as by fermentation, or enzymatic oxidation. The amino acids may be removed from the liquid by passing the liquid through a suitable ion exchange column.

Any liquid which is separated from the mixture of finely divided solids and liquid contains a substantial proportion of the coagulable protein content of the original potatoes. These proteins contain nutrient as well as flavor value. Therefore, it is frequently desirable to return them to the finely divided solids phase. If the separated liquid is not to be returned to the solids as such (i.e., if, for example, the amount of liquid removed is replaced by the addition of water to the solids phase) then the proteins may be recovered from the liquid such as by heat coagulation and returned to the solids phase. Thus, if the liquid is heated to a temperature between 145° and 165° F., or if the liquid is flashed at a higher temperature for a short period of time, the proteins will coagulate and precipitate. They may then be recovered by filtration and returned to the finely divided solids.

In any event, if a portion of the liquid is removed from the pulp, sufficient liquid should be returned so that the composition will have approximately the same solids content as the original pulp. It should be emphasized that any removal of liquid from the raw pulp is optional and is not essential to the practice of this invention.

The mixture of finely divided solids and liquid is heated to gelatinize at least 80% by weight of the indigenous starch—i.e., the native starch contained in the potatoes. The heat gelatinization of the potato pulp may be accomplished in any suitable heat exchanger such as, for example, a radar range. It is preferred to utilize a scraped surface heat exchanger (i.e., one which provides means for continuously scraping the potato pulp from the surface of the heat exchanger during operation) and to mix the potato pulp during the heating operation.

The potato pulp should be heated to a temperature of from about 150 to 212° F. in order to gelatinize the starch. The duration of the heating operation will depend upon the length of time required to gelatinize at least 80% of the starch.

The gelatinization of the starch increases the viscosity of the pulp to from about 2 to $6 \times 10^5$ cps.

After at least 80% of the starch in the pulp has gelatinized, it is preferrd to cool the pulp in order to further increase its viscosity to from about 1 to $20 \times 10^6$ cps. Cooling may be accomplished in any suitable apparatus, such as a scraped surface heat exchanger, or simply by allowing it to stand at room temperature or by storing it in a cool room. The particular manner by which the cooling is effected is not critical. It is preferred that the temperature of the pulp be lowered to from between about 40 to 70° F. Cooling the pulp eliminates some of its cohesiveness and renders the pulp easier to process in subsequent operations.

Other ingredients may be admixed with the potato pulp, either before or after the indigenous starch is gelled, which do not adversely affect the nature, such as the flavor and texture, of the final product. Such ingredients include salt, barbecue seasoning and other seasoning agents. However, nothing should be added which will interfere with or mask the potato flavor in the final product.

The potato pulp is next formed into shaped bodies by any suitable means. For example, the pulp may be rolled into a sheet and cut into pieces of the desired shape. Alternatively, the desired potato products may be formed by extruding shaped bodies. In a preferred embodiment of this invention, the pulp is extruded through a variable orifice extrusion die to form round or oval shaped chips.

Another means by which shaped bodies may be formed from the pulp is by rapidly cooling the pulp almost to its freezing point (about 28° F.) and slicing the mass into pieces of the desired shape and size. During cooling, the pulp passes through a semi-solid state before freezing solid. At this point, it may be easily sliced with a sharp knife.

After forming, the shaped bodies may be dusted with a starchy or farinaceous material to reduce their cohesiveness.

The shaped bodies are composed of about ⅘ moisture. Before frying, it is necessary to dry the shaped bodies in order to bring their solids content to from 50 to 95%, and preferably from about 75 to 90% by weight. The drying step is essential in order to achieve proper textural characteristics in the final product. The shaped bodies may be dried at ambient temperatures or by heating up to 300° F. for a short time in an oven.

During the drying operation, the shaped bodies shrink to about ½ their original size. The dried bodies are hard and translucent. They are then fried in deep fat at a temperature of from 300 to 400° F. for from about 5 to 15 seconds.

Any conventional apparatus which is ordinarily used for deep fat frying may be employed to cook the potato products of this invention. The frying may be accomplished by means of a batch operation, in which a batch of shaped potato bodies are charged directly into the cooker, agitated and then removed; or by means of a continuous frying process, in which the dried potato bodies, such as chips, are fed into one end of a cooker and are continuously removed from the other end.

The type and temperature of fat or oil used to cook the chips are those conventionally used in deep fat frying potato chips. There may be used, for example, cottonseed oil, peanut oil, corn oil, soybean oil, mixtures of any of these, or coconut oil. The temperature in the cooker generally varies between about 320° F. and 375° F.

During the frying operation, the moisture content of the shaped bodies is reduced to below about 10% by weight. The shaped bodies absorb up to 50% by weight of oil and expand about 300% in thickness and area. The resultant products have a friable honeycomb type of texture. The products are characterized by uniformity of color, flavor, texture, oil content, size, etc., both within each individual chip and between all of the chips. The products of this invention are crisp and have an elegant flavor.

By the practice of this invention, fat fried potato products, such as chips, can be made from potatoes which contain a much higher amount of sugar than has been previously possible. Thus, the pulp from which the chips are formed may be prepared from potatoes which have a reducing sugar content in excess of 1% by weight which is about ten times the normal limit.

According to another embodiment of this invention, the moisture content of the raw potatoes may be reduced to as low as about 55% by weight prior to heating to gelatinize the starch. This embodiment results in the formation of a pulp of increased viscosity and permits the pulp to be formed into shaped bodies at higher temperatures after gelatinization of the starch.

The following examples illustrate the best modes contemplated for carrying out this invention.

*Example 1*

Raw potatoes (5 pounds), having a moisture content of approximately 80 percent by weight, are washed, trimmed, sliced into discs of about ¼" thickness, treated with a 0.3% by weight aqueous sodium bisulfite solution, and put through a high speed cutting mill. A mixture of finely divided solids in liquid is formed having a viscosity of $7 \times 10^4$ cps. This pulp is heated for 5 minutes in a scraped surface heat exchanger to a temperature of 200° F. to gel at least 80% of the starch in the pulp. The heated pulp, which has a viscosity of $2 \times 10^5$ cps., is then cooled to 50° F. The cooled pulp, having a viscosity of $2 \times 10^6$ cps., is extruded through an extrusion orifice of varying width and a thickness of 0.030 inch into 2 x 3 inch elliptical-shaped chips. These chips are heated in a hot air oven having a perpendicular air flow of 500 feet per minute at 200 to 300° F. and a relative humidity of 6% for 30 minutes. The resulting dried chips, which contain 15% by weight of moisture and 85% by weight solids, are hard and translucent and are about ½ their original size. The chips are then fried by submerging them for 5 seconds in fat at 380° F. and immediately removed. The resulting chips, which have expanded in size about 300%, contain 30% by weight of fat and 5% by weight of moisture. They possess a crisp, friable texture, a golden color and have a good potato chip flavor.

*Example 2*

To five pounds of raw potato pulp prepared as in Example 1, there are added and admixed therewith 1.5 ounces of commercial barbecue seasoning. The pulp is then processed as described in Example 1 to form chips containing 30% by weight of oil and 4% by weight of moisture. The resultant chips possess a crisp, friable texture, are reddish-brown in color and have a good barbecued potato chip flavor.

*Example 3*

Potatoes (1000 parts by weight), of varying sizes and grades and of the cobbler variety, are peeled, sliced into pieces about ¼ inch x ¼ inch x 1 inch, washed, treated with a 0.3% by weight aqueous sodium metabisulfite solution, and put through an Urschel rotary cutting mill. The blades on the head of the mill are spaced about 0.02 inch apart and the impeller is rotated at a speed of about 7200 r.p.m. A mixture of finely divided solids in liquid is formed. The maximum particle size of the solids in the mixture is 0.02 inch in diameter. The mixture is heated with mixing to 180° F. for a time sufficient to gel at least 80% of the starch in the mixture. The mixture is then chilled to 30° F. at which temperature it is in a semi-solid state. Chips are sliced from the chilled mixture with a sharp knife and are given a surface application of flour. The chips are then air dried at ambient temperature to a moisture content of about 25%. They are then submerged in fat at 380° F. for 5 seconds. The resultant chips are of a uniform light golden color and have a uniform oil content.

*Example 4*

The process of Example 1 is repeated except that 55% by weight of the mixture of finely divided solids and liquid is removed as liquid from the raw pulp by centrifuging and the liquid is recovered. The liquid is run through a vertical ion exchange column containing an anion exchange resin (Amberlite IRH–400, quaternized chloromethylated polystyrene) to remove the amino acid content of the liquid. The effluent from the column is returned to the finely divided solids phase. The pulp is then processed as described in Example 1. The resultant chips were very light in color.

*Example 5*

Raw potatoes (5 pounds), having a moisture content of approximately 80 percent by weight, are washed, trimmed, sliced into discs of about ⅛" thickness, steeped for 30 minutes in a 0.3% by weight aqueous sodium bisulfite solution, drained to remove excess moisture and dried for about one hour at about 100° F. to a moisture content of about 60% by weight. The slices are then put through a high speed Urschel cutting mill on which the blades on the head of the mill are spaced about 0.02 inch apart. The resultant pulp is heated for 5 minutes in a scraped surface heat exchanger to a temperature of 200° F. to gel at least 80% of the starch in the pulp. The heated pulp, is then cooled to 100° F. and is extruded through an extrusion orifice of varying width and a thickness of 0.030 inch into 2 x 3 inch elliptical-shaped chips. These chips are heated in a hot air oven having a perpendicular air flow of 500 feet per minute at 200 to 300° F. and a relative humidity of 6% for 30 minutes. The resulting dried chips contain 15% by weight of moisture and 85% by weight solids. The chips are then fried by submerging them for 5 seconds in fat at 380° F. and immediately removed. The resulting chips, contain 29% by weight of fat and 4% by weight of moisture, possess a crisp friable texture, a golden color and have a good potato flavor.

I claim:

1. A process for producing a potato product which comprises reducing the particle size of raw potatoes to form a mixture of finely divided solids and liquid, heating said mixture to a temperature of from about 150 to 212° F. to gelatinize at least 80% by weight of the starch in said mixture, forming said mixture into shaped bodies, drying said shaped bodies to bring their solids content to from 50 to 95% by weight, and subsequently frying said dried shaped bodies.

2. A process according to claim 1 wherein said bodies are fried in deep fat.

3. A process according to claim 2 wherein the moisture content of said raw potatoes is reduced to as low as about 55% by weight prior to heating to gelatinize the starch.

4. A process for producing a potato product which comprises reducing the particle size of raw potatoes to form a mixture of finely divided solids and liquid, heating said mixture to a temperature of from about 150 to 212° F. to gelatinize at least 80% by weight of the starch, cooling said mixture to a temperature of from about 30 to 100° F., forming said mixture into shaped bodies, drying said shaped bodies to bring their solids content to from 75 to 90% by weight, said solids consisting essentially of potato solids, and subsequently frying said dried shaped bodies in deep fat.

5. A process according to claim 4 wherein said mixture is cooled to a temperature of from about 40 to 70° F. prior to forming into shaped bodies.

6. A process according to claim 4 wherein said shaped bodies are dusted with a farinaceous material prior to drying.

7. A crisp friable, expanded potato chip obtained by a process which comprises reducing the particle size of raw potatoes to form a mixture of finely divided solids and liquid, heating said mixture to a temperature of from about 150 to 212° F. to gelatinize at least 80% by weight of the starch in said mixture, forming said mixture into thin chips, drying said chips to bring their solids content to from 50 to 95% by weight, and subsequently frying said shaped chips, said fried chips containing up to 10% by weight of moisture and up to 50% by weight of fat, the remainder being solids consisting essentially of potato solids.

References Cited by the Examiner

UNITED STATES PATENTS

| | | | |
|---|---|---|---|
| 2,176,347 | 10/1939 | Jansen | 99—100 |
| 2,783,154 | 2/1957 | Rivoche | 99—100 X |
| 2,791,508 | 5/1957 | Rivoche | 99—100 X |
| 2,856,295 | 10/1958 | Scharf | 99—207 X |
| 3,085,020 | 4/1963 | Backinger | 99—207 |

OTHER REFERENCES

Talburt et al., "Potato Processing," pp. 444–445, Avi Pub. Co., 1959.

A. LOUIS MONACELL, *Primary Examiner.*